Patented Apr. 4, 1950

2,502,418

UNITED STATES PATENT OFFICE 2,502,418

CEMENTITIOUS BINDER

Conral C. Callis, Manheim, Pa., assignor to Armstrong Cork Company, Lancaster, Pa., a corporation of Pennsylvania No Drawing. Application December 13, 1945, Serial No. 634,900

5 Claims. (Cl. 106—85)

This invention relates to heat insulating blocks and method of making the same. This application is a continuation-in-part of my co-pending application Serial No. 476,058, filed February 16, 1943, Patent No. 2,396,246, which is in turn a continuation-in-part of my co-pending applications Serial Nos. 380,815, filed February 27, 1941, and 336,963, filed May 24, 1940, both now abandoned.

The present invention is directed to the formation of a heat insulating block utilizing a binder formed by the reaction at temperatures between about 32° F. and about 125° F. of a water soluble alkali metal aluminate and an alkaline earth oxide.

It is an object of the invention to provide heat insulating blocks having good resistance to rupture under bending and compressive stresses at all temperatures to which such blocks are customarily subjected.

It is a further object of the invention to provide a heat insulating block having low thermal conductivity at the elevated temperatures occurring in installations where the blocks are used.

These objectives are accomplished by combining a filler material preferably of a heat resistant character and a binder made by the reaction in a water slurry at temperatures between about 32° F. and about 125° F. of an alkali metal aluminate and a hydrated alkaline earth oxide. It appears that the alkaline earth oxide combines with the alkali metal aluminate in the presence of moisture at such temperatures to form a cementitious substance which acts as a binder for the filler material.

The alkaline earth oxide which may be used in my process may be that of calcium, barium, magnesium, strontium, as well as a mixture of any of these, such as a calcium-magnesium oxide mixture made from dolomite. The calcium oxide or the calcium-magnesium oxide mixture are preferred because of their ready availability and low cost.

The alkali metal aluminate may be of sodium or potassium although any of the other alkali metal aluminates may be used if and when they become commercially available. Mixtures of alkali metal aluminates may also be used.

In order to obtain a satisfactory binder it has been found that the proportion of the hydrated alkaline earth oxide to the alkali metal aluminate should be on the basis of about three mols of hydrated alkaline earth oxide (calculated as alkaline earth oxide) to about two mols of alkali metal aluminate. Of course, there may be an excess of either of the constituents but, in view of the cost of the alkali metal aluminate, it is preferable to use but two mols to each three mols of the hydrated alkaline earth oxide. An excess of the hydrated alkaline earth oxide will not be objectionable since its cost is relatively low, but since the chemical reaction which occurs requires the molar ratio recited above, there is no necessity for incorporating an excess of either of the ingredients. As a matter of fact, the binder which is formed by the reaction product will in no event contain more than three mols of the hydrated alkaline earth oxide to two mols of the alkali metal aluminate even though an excess of the oxide may be present but uncombined.

In order to obtain a block having the desired strength characteristics the binder should be present in the finished product in a quantity from about ten percent to about forty percent by weight based upon the weight of the total solids in the raw slurry. The precise quantity of binder employed will depend to a considerable extent upon the type of filler or fillers incorporated in the block, the strength and conductivity characteristics necessary in the finished product, and other variable factors.

Either the alkaline earth hydroxides or the alkaline earth oxides may be employed as starting materials, but when the oxide is added to water it is immediately hydrated with the evolution of heat and the slurry should be cooled to at least about 125° F. before the alkali metal aluminate is added to the slurry. The reaction is between the alkaline earth hydroxide and the alkali metal aluminate and it should be accomplished at temperatures between about 32° F. and about 125° F. I prefer to operate at temperatures between about 50° F. and 100° F., ordinary room temperatures and the range in which tap water is generally available, but as pointed out above satisfactory results are obtained when the temperature is between about 32° F., the freezing point of the water, and about 125° F., above which a substantial amount of fine powder having substantially no binding value is obtained. Between 100° F. and 125° F. some powder is formed but not in objectionable quantities. Optimum results are obtained between about 50° F. and 85° F. In some instances it may be desirable to apply heat to the slurry, particularly if the temperature is down in the neighborhood of freezing so as to accelerate the reaction. As pointed out above, in other instances it may be desirable to cool the slurry or allow it to stand until the desired reaction temperature is reached, particularly where an oxide is used and heat is evolved in its hydration.

The filler material preferably includes asbestos fibers which are especially suited as an incombustible auxiliary strengthening agent, but other fibers such as mineral or glass wool may be substituted for part or all of the asbestos. Fibers of an organic character such as paper fibers, redwood bark fibers and the like may be used. The amount of fiber used is not critical; generally about ten percent based on the total solids in the raw slurry is adequate. The main body of the filler material is preferably diatomaceous earth, either calcined or raw, exfoliated vermiculite, or other inorganic filler materials, with about ten percent of fiber. The filler may be wholly fibrous or in particles if desired.

While the binder consists essentially of the reaction product at room temperatures of the alkali metal aluminate and the hydrated alkaline earth oxide, other cementitious materials may be added such as clay, aluminous cement, basic magnesium carbonate, and self-setting crystals of normal magnesium carbonate ($MgCO_3.3H_2O$ or $MgCO_3.5H_2O$).

Any desired order of mixing may be utilized. However, it is preferred to add the filler materials during the latter part of the mixing process. Preferably the binder is formed by reacting the binder ingredients in the presence of the filler although the binder may be prepared in advance and mixed with the filler materials. The consistency of the slurry which is formed may vary widely depending upon the method of forming the blocks. Obviously a larger amount of water will be necessary if a filter press is used to form the block while less water will be necessary if hand molding methods are employed. While it is preferred to employ some pressure (up to about forty pounds per square inch) in forming the block or cake from the slurry, because the final blocks as so made have greater strength in proportion to the degree of pressure used; nevertheless, blocks or cakes formed by permitting the solids to set in the slurry while it is in an aqueous condition and without use of pressure to press water therefrom, possess sufficient strength for some purposes. The blocks may be dried by heating to an elevated temperature in the neighborhood of 150° F. to 400° F. The elevated temperature is not used to effectuate the reaction between the alkaline earth oxide and the alkali metal aluminate. This reaction takes place at about room temperature and temperatures thereabove should be avoided to produce a well bonded, light weight material having good insulating properties. The drying of the block subsequent to the reaction of the binder ingredients facilitates the removal of uncombined water from the pressed and reacted block.

The following examples are illustrative of the invention.

Example 1

A slurry containing 64 pounds of calcined diatomaceous earth, 8 pounds of asbestos fiber, and 8 pounds of binder produced by combining three mols of hydrated calcium oxide and two mols of sodium aluminate is made up in 50 gallons of water. In making this slurry the hydrated calcium oxide (slacked lime) and the sodium aluminate are added to the water and mixed thoroughly. The diatomaceous earth is then added with continued mixing and the asbestos fibers are incorporated. The slurry is then pumped to a filter press where the water is removed to form a rough block. The rough block is dried and then sized to the desired dimensions.

Example 2

A slurry is made of 8.4 pounds of sodium aluminate and 13.2 pounds of slacked lime (equivalent to 10 pounds of calcium oxide) in about 20 gallons of water. The ingredients are permitted to react at room temperature and a jelly-like cementitious mix is formed. Sixteen pounds of this binder (on a solids basis) are mixed in about 30 gallons of water and 56 pounds of raw diatomaceous earth, and 8 pounds of fibrous filler material such as asbestos fiber, mineral wool or glass wool fibers are then added with continuous mixing. The slurry is pumped to a filter press where the water is removed to form a rough block. This block is then dried and sized to desired dimensions.

Example 3

A slurry is made up containing 16.8 pounds of sodium aluminate and 26.4 pounds of slacked lime in about 50 gallons of water. This produces about 32 pounds of binder on a solids basis. To this is added 40 pounds of vermiculite and 8 pounds of asbestos fiber or its equivalent. The slurry is continuously mixed during the incorporation of the various ingredients and is then pumped to a filter press where the water is removed to form a rough block. The rough block is dried and then sized to the desired dimensions.

In Example 1 above, the binder constitutes about ten percent by weight based on the weight of the solid materials; in Example 2 about 20 percent; and in Example 3 about 40 percent. In each instance the binder is formed by the reaction at room temperatures of three mols of hydrated alkaline earth oxide, calculated as alkaline earth oxide, and two mols of alkali metal aluminate. The temperature of the slurry in all instances is between 32° F. and 125° F.

The heat insulating block produced by this invention may be used at elevated temperatures up to about 1800° F. when calcined diatomaceous earth or vermiculite is used and about 1500° F. when raw diatomaceous earth is used. The insulation may be used wherever a heat resistant material having low heat conductivity is required.

While I have described certain preferred embodiments in my invention I do not wish to be limited thereto since the invention may be otherwise embodied and practiced within the scope of the following claims.

I claim:

1. A cementitious binder material consisting essentially of the product obtained by reacting at a temperature between about 32° F. and about 125° F., a water slurry of about three mols of hydrated alkaline earth oxide, calculated as alkaline earth oxide, and about two mols of an alkali metal aluminate which is reactive with the hydrated alkaline earth oxide at such temperature.

2. A cementitious binder consisting essentially of the product obtained by reacting at a temperature between about 50° F. and about 85° F., a water slurry of about three mols of hydrated alkaline earth oxide, calculated as alkaline earth oxide, and about two mols of an alkali metal aluminate which is reactive with the hydrated alkaline earth oxide at such temperature.

3. A cementitious binder consisting essentially of the product obtained by reacting at a temperature between about 32° F. and about 125° F., a water slurry of about three mols of calcium hydroxide, calculated as calcium oxide, and about two mols of an alkali metal aluminate which is reactive with the calcium hydroxide at such temperature.

4. A cementitious binder consisting essentially of the product obtained by reacting at a temperature between about 32° F. and about 125° F., a water slurry of about three mols of calcium hydroxide, calculated as calcium oxide, and about two mols of sodium aluminate which is reactive with the calcium hydroxide at such temperature.

5. A cementitious binder consisting essentially of the product obtained by reacting at a temperature between about 32° F. and about 125° F., a water slurry of about three mols of hydrated alkaline earth oxide, calculated as alkaline earth oxide, and about two mols of sodium aluminate which is reactive with the hydrated alkaline earth oxide at such temperature.

CONRAL C. CALLIS.

REFERENCES CITED

The following references are of record in the file of this patent:

UNITED STATES PATENTS

| Number | Name | Date |
|---|---|---|
| 2,396,246 | Callis | Mar. 12, 1946 |